United States Patent
Kidd et al.

(10) Patent No.: US 8,978,380 B2
(45) Date of Patent: Mar. 17, 2015

(54) ADIABATIC COMPRESSED AIR ENERGY STORAGE PROCESS

(75) Inventors: H. Allan Kidd, Shinglehouse, PA (US); Harry F. Miller, Allegany, NY (US)

(73) Assignee: Dresser-Rand Company, Olean, NY (US)

( * ) Notice: Subject to any disclaimer, the term of this patent is extended or adjusted under 35 U.S.C. 154(b) by 252 days.

(21) Appl. No.: 13/050,781

(22) Filed: Mar. 17, 2011

(65) Prior Publication Data

US 2012/0036853 A1 Feb. 16, 2012

Related U.S. Application Data

(60) Provisional application No. 61/372,252, filed on Aug. 10, 2010.

(51) Int. Cl.
| | | |
|---|---|---|
| *F02C 6/16* | (2006.01) | |
| *F02C 1/04* | (2006.01) | |
| *F02C 7/143* | (2006.01) | |
| *F02C 6/18* | (2006.01) | |

(52) U.S. Cl.
CPC ... *F02C 6/16* (2013.01); *F02C 1/04* (2013.01); *F02C 6/18* (2013.01); *F02C 7/143* (2013.01); Y02E 60/15 (2013.01)
USPC ............ 60/650; 60/415; 60/682; 60/659; 165/10

(58) Field of Classification Search
CPC ............... F02C 1/04; F02C 6/16; F02C 6/18; F02C 7/143; Y02E 60/15
USPC ............ 60/415, 659, 650, 682, 651; 165/10
See application file for complete search history.

(56) References Cited

U.S. PATENT DOCUMENTS

| | | | |
|---|---|---|---|
| 2,421,387 | A | 6/1947 | Lysholm |
| 3,630,022 | A | 12/1971 | Jubb |
| 4,094,148 | A | 6/1978 | Nelson |
| 4,100,745 | A | 7/1978 | Gyarmathy |

(Continued)

FOREIGN PATENT DOCUMENTS

| | | |
|---|---|---|
| CA | 2673721 A1 | 7/2008 |
| CA | 2750585 A1 | 7/2010 |

(Continued)

OTHER PUBLICATIONS

Internet Article published Nov. 11, 2008 in Scandinavian Oil/Gas Magazine, entitled "Dresser-Rand invests "supersonic" compressor tech", http://www.scandoil.com/moxie-bm2/news/company_news/dresser-rand-invests-supersonic-compressor-tech.shtml published Nov. 11, 2008.*

(Continued)

*Primary Examiner* — Christopher Jetton
*Assistant Examiner* — Paul Thiede
(74) *Attorney, Agent, or Firm* — Edmonds & Nolte, PC (57) ABSTRACT

A compressed air energy storage system including a compressor adapted to receive a process gas and output a compressed process gas. A heat transfer unit may be coupled to the compressor and adapted to receive the compressed process gas and a heat transfer medium and to output a cooled process gas and a heated heat transfer medium. A compressed gas storage unit may be coupled to the heat transfer unit and adapted to receive and store the cooled process gas. A waste heat recovery unit may be coupled to the heat transfer unit and adapted to receive the heated heat transfer medium.

18 Claims, 3 Drawing Sheets

(56) References Cited

U.S. PATENT DOCUMENTS

| | | | |
|---|---|---|---|
| 4,148,191 A | 4/1979 | Frutschi | |
| 4,150,547 A | 4/1979 | Hobson | |
| 4,158,145 A | 6/1979 | Kartsounes et al. | |
| 4,275,310 A | 6/1981 | Summers | |
| 4,281,256 A * | 7/1981 | Ahrens et al. | 290/1 R |
| 4,347,706 A | 9/1982 | Drost | |
| 4,348,863 A | 9/1982 | Taylor et al. | |
| 4,391,552 A | 7/1983 | O'Hara | |
| 4,523,432 A * | 6/1985 | Frutschi | 60/659 |
| 4,593,202 A | 6/1986 | Dickinson | |
| 4,644,202 A * | 2/1987 | Kroy et al. | 310/58 |
| 4,677,307 A | 6/1987 | Vadas | |
| 4,765,142 A | 8/1988 | Nakhamkin | |
| 4,849,648 A | 7/1989 | Longardner | |
| 4,870,816 A | 10/1989 | Nakhamkin | |
| 4,872,307 A | 10/1989 | Nakhamkin | |
| 4,885,912 A | 12/1989 | Nakhamkin | |
| 4,936,098 A | 6/1990 | Nakhamkin | |
| 4,995,234 A | 2/1991 | Kooy | |
| 5,181,376 A | 1/1993 | Rao | |
| 5,379,589 A | 1/1995 | Cohn et al. | |
| 5,384,489 A | 1/1995 | Bellac | |
| 5,442,904 A | 8/1995 | Shnaid | |
| 5,448,889 A | 9/1995 | Bronicki | |
| 5,491,969 A | 2/1996 | Cohn | |
| 5,495,709 A | 3/1996 | Frutschi | |
| 5,537,822 A | 7/1996 | Shnaid | |
| 5,632,143 A | 5/1997 | Fisher et al. | |
| 5,634,340 A | 6/1997 | Grennan | |
| 5,660,037 A | 8/1997 | Termuehlen | |
| 5,778,675 A | 7/1998 | Nakhamkin | |
| 5,845,479 A | 12/1998 | Nakhamkin | |
| 5,931,021 A | 8/1999 | Shnaid et al. | |
| 5,934,063 A | 8/1999 | Nakhamkin | |
| 6,038,849 A | 3/2000 | Nakhamkin | |
| 6,134,873 A | 10/2000 | Nakhamkin | |
| 6,244,037 B1 | 6/2001 | Nakhamkin | |
| 6,260,269 B1 | 7/2001 | Turnquist et al. | |
| 6,276,123 B1 | 8/2001 | Chen | |
| 6,305,158 B1 | 10/2001 | Nakhamkin | |
| 6,442,941 B1 | 9/2002 | Anand et al. | |
| 6,512,305 B1 | 1/2003 | Pinkerton | |
| 6,637,207 B2 | 10/2003 | Konezciny | |
| 6,694,722 B2 | 2/2004 | Kreitmeier | |
| 6,708,500 B2 | 3/2004 | Huster | |
| 6,715,296 B2 | 4/2004 | Bakran et al. | |
| 6,725,663 B2 | 4/2004 | Bakran | |
| 6,725,665 B2 | 4/2004 | Tuschy | |
| 6,745,569 B2 | 6/2004 | Gerdes | |
| 6,792,756 B2 | 9/2004 | Bakran | |
| 6,792,760 B2 | 9/2004 | Mathias | |
| 6,817,187 B2 | 11/2004 | Yu | |
| 6,848,259 B2 | 2/2005 | Keller-Sornig | |
| 6,851,265 B2 | 2/2005 | Elwood et al. | |
| 6,863,474 B2 | 3/2005 | Webster et al. | |
| 6,901,759 B2 | 6/2005 | Frutschi | |
| 6,901,760 B2 | 6/2005 | Dittmann et al. | |
| 6,920,759 B2 | 7/2005 | Wakana et al. | |
| 6,927,503 B2 | 8/2005 | Enis et al. | |
| 6,931,856 B2 | 8/2005 | Belokon et al. | |
| 6,955,050 B2 | 10/2005 | Perkins | |
| 7,073,335 B2 | 7/2006 | Gerdes | |
| 7,086,231 B2 | 8/2006 | Pinkerton | |
| 7,127,895 B2 | 10/2006 | Pinkerton | |
| 7,150,154 B2 | 12/2006 | Althaus | |
| 7,223,065 B2 | 5/2007 | Suter | |
| 7,325,401 B1 | 2/2008 | Kesseli | |
| 7,389,644 B1 | 6/2008 | Nakhamkin | |
| 7,406,828 B1 | 8/2008 | Nakhamkin | |
| 7,471,010 B1 | 12/2008 | Fingersh | |
| 7,500,349 B2 | 3/2009 | Althaus | |
| 7,503,178 B2 | 3/2009 | Bücker et al. | |
| 7,614,237 B2 | 11/2009 | Nakhamkin | |
| 7,614,239 B2 | 11/2009 | Herzog | |
| 7,640,643 B2 | 1/2010 | Nakhamkin | |
| 7,663,255 B2 | 2/2010 | Kim | |
| 7,669,419 B2 | 3/2010 | Juby | |
| 7,669,423 B2 | 3/2010 | Nakhamkin | |
| 7,677,046 B2 | 3/2010 | Althaus | |
| 7,681,395 B2 | 3/2010 | Pinkerton | |
| 7,692,327 B2 | 4/2010 | Althaus | |
| 7,693,402 B2 | 4/2010 | Hudson | |
| 7,703,271 B2 | 4/2010 | Minkkinen et al. | |
| 7,719,127 B2 | 5/2010 | Bertolotti | |
| 7,721,552 B2 | 5/2010 | Hansson et al. | |
| 7,743,609 B1 | 6/2010 | Brostmeyer | |
| 7,753,646 B1 | 7/2010 | Keck | |
| 7,772,715 B2 | 8/2010 | Wiederhold | |
| 7,784,286 B2 | 8/2010 | Bolis et al. | |
| 7,802,426 B2 | 9/2010 | Bollinger | |
| 7,832,213 B2 | 11/2010 | Carroni et al. | |
| 7,874,036 B2 | 1/2011 | Wong | |
| 7,874,155 B2 | 1/2011 | McBride | |
| 7,900,455 B2 | 3/2011 | Althaus | |
| 7,908,842 B2 | 3/2011 | Eroglu et al. | |
| 7,918,091 B1 | 4/2011 | Perkins | |
| 7,954,330 B2 | 6/2011 | Althaus | |
| 7,963,097 B2 | 6/2011 | Mastronarde | |
| 8,011,189 B2 | 9/2011 | Nakhamkin | |
| 8,015,812 B1 | 9/2011 | Kesseli | |
| 8,024,928 B2 | 9/2011 | Enis | |
| 8,037,677 B2 | 10/2011 | Fong et al. | |
| 8,037,678 B2 | 10/2011 | McBride | |
| 8,037,679 B2 | 10/2011 | Fong et al. | |
| 8,042,570 B2 | 10/2011 | Shindo | |
| 8,061,132 B2 | 11/2011 | Fong et al. | |
| 8,065,873 B2 | 11/2011 | Fong et al. | |
| 8,065,874 B2 | 11/2011 | Fong et al. | |
| 8,087,241 B2 | 1/2012 | Fong et al. | |
| 8,104,274 B2 | 1/2012 | McBride et al. | |
| 8,117,842 B2 | 2/2012 | McBride et al. | |
| 8,122,718 B2 | 2/2012 | McBride et al. | |
| 8,146,354 B2 | 4/2012 | Fong et al. | |
| 8,151,549 B2 | 4/2012 | Sasaki et al. | |
| 8,156,725 B2 | 4/2012 | Littau et al. | |
| 8,171,728 B2 | 5/2012 | Bollinger et al. | |
| 8,176,724 B2 | 5/2012 | Smith | |
| 8,181,456 B2 | 5/2012 | Fong et al. | |
| 8,182,240 B2 | 5/2012 | Fong et al. | |
| 8,191,360 B2 | 6/2012 | Fong et al. | |
| 8,191,361 B2 | 6/2012 | Fong et al. | |
| 8,196,395 B2 | 6/2012 | Fong et al. | |
| 8,196,398 B2 | 6/2012 | Fong et al. | |
| 8,201,402 B2 | 6/2012 | Fong et al. | |
| 8,201,403 B2 | 6/2012 | Fong et al. | |
| 8,215,105 B2 | 7/2012 | Fong et al. | |
| 8,215,106 B2 | 7/2012 | Fong et al. | |
| 8,240,142 B2 | 8/2012 | Fong et al. | |
| 8,261,522 B2 * | 9/2012 | Coffin et al. | 56/249 |
| 8,261,552 B2 | 9/2012 | Nakhamkin | |
| 8,347,628 B2 | 1/2013 | Gerard | |
| 8,347,629 B2 | 1/2013 | Finkenrath et al. | |
| 8,353,156 B2 | 1/2013 | Fong et al. | |
| 8,356,478 B2 | 1/2013 | Fong et al. | |
| 8,387,374 B2 | 3/2013 | Fong et al. | |
| 8,393,148 B2 | 3/2013 | Fong et al. | |
| 8,436,489 B2 | 5/2013 | Stahlkopf et al. | |
| 8,450,884 B2 | 5/2013 | Stahlkopf et al. | |
| 8,468,814 B2 | 6/2013 | Fong et al. | |
| 8,468,817 B2 | 6/2013 | Fong et al. | |
| 8,482,152 B1 | 7/2013 | Stahlkopf et al. | |
| 8,505,288 B2 | 8/2013 | Fong et al. | |
| 8,516,809 B2 | 8/2013 | Fong et al. | |
| 8,516,810 B2 | 8/2013 | Fong et al. | |
| 8,534,058 B2 | 9/2013 | Brun et al. | |
| 8,561,399 B2 | 10/2013 | Fong et al. | |
| 8,572,972 B2 | 11/2013 | Frey et al. | |
| 8,756,928 B2 | 6/2014 | Fong et al. | |
| 8,756,929 B2 | 6/2014 | Fong et al. | |
| 8,769,943 B2 | 7/2014 | Fong et al. | |
| 8,793,989 B2 | 8/2014 | Fong et al. | |
| 8,806,861 B2 | 8/2014 | Fong et al. | |
| 8,844,277 B2 | 9/2014 | Fong et al. | |
| 8,863,519 B2 | 10/2014 | Kraft | |

(56) References Cited

U.S. PATENT DOCUMENTS

| | | |
|---|---|---|
| 2003/0131599 A1 | 7/2003 | Gerdes |
| 2005/0178114 A1 | 8/2005 | Althaus et al. |
| 2005/0268594 A1 | 12/2005 | Kurihara et al. |
| 2005/0275225 A1 | 12/2005 | Bertolotti |
| 2006/0213183 A1 | 9/2006 | Althaus |
| 2007/0095069 A1 | 5/2007 | Joshi et al. |
| 2007/0234749 A1 | 10/2007 | Enis |
| 2008/0178601 A1 | 7/2008 | Nakhamkin |
| 2008/0178602 A1 | 7/2008 | Nakhamkin |
| 2008/0196429 A1 | 8/2008 | Petrenko |
| 2008/0236168 A1 | 10/2008 | Carroni et al. |
| 2008/0272597 A1 | 11/2008 | Althaus |
| 2008/0272598 A1 | 11/2008 | Nakhamkin |
| 2009/0100835 A1 | 4/2009 | Nakhamkin |
| 2009/0145103 A1 | 6/2009 | Nakhamkin |
| 2009/0178384 A1 | 7/2009 | Nakhamkin |
| 2009/0230696 A1 | 9/2009 | Enis |
| 2009/0282840 A1 | 11/2009 | Chen |
| 2010/0043437 A1 | 2/2010 | Nakhamkin |
| 2010/0251712 A1 | 10/2010 | Nakhamkin |
| 2011/0016864 A1 | 1/2011 | Wright et al. |
| 2011/0094231 A1 | 4/2011 | Freund |
| 2011/0100010 A1 | 5/2011 | Freund et al. |
| 2013/0232974 A1 | 9/2013 | Nakhamkin |
| 2014/0137563 A1 | 5/2014 | Kerth et al. |

FOREIGN PATENT DOCUMENTS

| | | |
|---|---|---|
| CA | 2751160 A1 | 8/2010 |
| CA | 2783593 A1 | 6/2011 |
| CN | 1308708 A | 8/2001 |
| CN | 101225769 A | 7/2008 |
| CN | 101230799 A | 7/2008 |
| CN | 102308065 A | 1/2012 |
| CN | 102822474 A | 12/2012 |
| DE | 3139567 | 4/1983 |
| DE | 10 2004 040 890 A1 | 3/2005 |
| EP | 2510208 | 10/2012 |
| JP | 10238732 A * | 9/1998 |
| JP | 2012515878 A | 7/2012 |
| RU | 2029119 C1 | 2/1995 |
| WO | WO 2007/124592 A1 | 11/2007 |
| WO | 2008091503 A2 | 7/2008 |
| WO | WO 2008/091502 A2 | 7/2008 |
| WO | 2010039302 A1 | 4/2010 |
| WO | 2010085272 A1 | 7/2010 |
| WO | 2010090653 A1 | 8/2010 |
| WO | 2011071609 A1 | 6/2011 |
| WO | 2011159586 A2 | 12/2011 |
| WO | WO 2011/163456 A1 | 12/2011 |
| WO | 2012021285 | 2/2012 |

OTHER PUBLICATIONS

English Machine Translation of Japanese Pat. No. JP 410238732 A (Document No. JP 10238732 A).*

Definition of the word "couple". Webpage [online]. Merriam-Webster [retrieved on Sep. 6, 2014]. Retrieved from the Internet: <URL: www.merriam-webster.com/dictionary/couple>.*

International Application No. PCT/US2011/045275—International Search Report and Written Opinion mailed Feb. 23, 2012.

Dresser-Rand, Steam Turbine, Motor & Generator Division—"An Answer to Energy Storage"—9303-CAES, Wellsville, NY, 6 pages.

Dresser-Rand, Steam Turbine, Motor & Generator Division—"Compressed Air Energy Storage Turbomachinery"—EPRI CAES Working Group, Oct. 26, 1988, Greenville, South Carolina, 6 pages.

Charles W. Gernnan, "Cogeneration with Compressed Air Energy Storage"—Dresser-Rand Docket #1055, STMG: TB-93-4, Fax dated Dec. 21, 1993, 5 pages.

H. Allan Kidd, "Adiabatic CAES Concept ARPAe Grant Supporting Information"—Dresser-Rand Company, Jan. 2010, 17 pages.

Chris Bullough, Christoph Gatzen, Christoph Jakiel, Martin Koller, Andreas Nowi, and Stefan Zunft, "Advanced Adiabatic Compressed Air Energy Storage for the Integration of Wind Energy"—ALSTOM Power Technology Centre, Leicester, UK, 8 pages.

Henrik Lund—"Large-Sale Integration of Wind Power Into Different Energy Systems", Department of Development and Planning, Aalborg University, Aalborg, Denmark—Feb. 28, 2004; Science Direct, Energy 30 (2005) pp. 2402-2412.

De Biasi, Victor, "Fundamental analysis to optimize adiabatic CAES plant efficiencies," *Gas Turbine World*, Sep.-Oct. 2009, 3 pages.

Dresser-Rand, "SMARTCAES Power Generation Mode PFD Configuration—Topping Cycle/Split Train," Drawing (Apex-2300 PSIA), *Dresser-Rand: Turbo Products Division*, Olean, NY, Apr. 4, 2012, 1 page.

PCT/US2009/048077—Notification of Transmittal of International Search Report and Written Opinion of the International Searching Authority, International Search Report and Written Opinion of International Searching Authority, mailed Aug. 17, 2009, 10 pages.

PCT/US2009/048080—Notification of Transmittal of International Search Report and Written Opinion of the International Searching Authority, International Search Report and Written Opinion of International Searching Authority, mailed Aug. 20, 2009, 8 pages.

PCT/US2009/048082—Notification of Transmittal of International Search Report and Written Opinion of the International Searching Authority, International Search Report and Written Opinion of International Searching Authority, mailed Aug. 17, 2009, 7 pages.

PCT/US2010/054382—Notification of Transmittal of International Search Report and Written Opinion of the International Searching Authority, International Search Report and Written Opinion of International Searching Authority, mailed Dec. 17, 2010, 8 pages.

Internet Article published Nov. 11, 2008 in Scandinavian Oil/Gas Magazine entitled "Dresser-Rand invests "supersonic" compressor tech", http://www.scandoil.com/moxie-bm2/news/company_news/dresser-rand-invests-supersonic-compressor-tech.shtml, published Nov. 11, 2008.

English Machine Translation of Japanese Patent No. JP 410238732 A (Document No. JP 10238732 A), 12 pages.

* cited by examiner

ADIABATIC COMPRESSED AIR ENERGY STORAGE PROCESS

CROSS REFERENCE TO RELATED APPLICATIONS

This application claims priority to U.S. Patent Application Ser. No. 61/372,252, which was filed Aug. 10, 2010. The priority application is hereby incorporated by reference in its entirety into the present application.

BACKGROUND

The present disclosure relates to systems and methods for compressed air energy storage (CAES), and more particularly to adiabatic CAES.

Oftentimes, electrical power consumed varies between peak hours and off-peak hours. For example, peak hours may include 8-12 daytime hours, and off-peak hours may include the remaining 12-16 hours of the day and/or night. CAES is a way to store energy generated during off-peak hours for use during peak hours.

In conventional CAES systems, excess power from an electrical grid is used to power an electric motor that drives a compressor. Gas (usually atmospheric air) compressed by the compressor is cooled and stored in a cavern at a high pressure. During peak hours, the compressed gas is drawn from the cavern, heated, and supplied to a combustion system that further expands the hot gas across a turbine. The energy from the heated compressed gas drives the turbine, which is coupled to and drives an electrical generator. The electrical generator generates electrical power that is re-supplied to the electrical grid. In the foregoing system, known as a "diabatic" CAES system, the heat energy from the gas output from the compressor is transferred out of the system, and additional energy is used to re-heat the compressed gas that is fed to the turbine.

It is therefore desirable to find improved CAES systems and methods offering higher efficiencies and reduced cost.

SUMMARY

Embodiments of the disclosure may provide a compressed air energy storage system. The system may include a compressor adapted to receive a process gas and output a compressed process gas. A heat transfer unit may be coupled to the compressor and adapted to receive the compressed process gas and a heat transfer medium and to output a cooled process gas and a heated heat transfer medium. A compressed gas storage unit may be coupled to the heat transfer unit and adapted to receive and store the cooled process gas. A waste heat recovery unit may be coupled to the heat transfer unit and adapted to receive the heated heat transfer medium. A thermal mass may be coupled to the waste heat recovery unit and the compressed gas storage unit, and the thermal mass may be adapted to be heated by the waste heat recovery unit, to receive the cooled process gas from the compressed gas storage unit, to heat the cooled process gas, and to output a heated process gas. A power generation unit may be coupled to the thermal mass and adapted to receive the heated process gas and generate a power output.

Embodiments of the disclosure may further provide a method of generating power. The method may include compressing a process gas with a compressor to produce a compressed process gas. The method may also include transferring heat from the compressed process gas to a heat transfer medium with a heat transfer unit to produce a cooled process gas and a heated heat transfer medium. The method may further include storing the cooled process gas in a compressed gas storage unit. The method may further include transporting the heated heat transfer medium to a waste heat recovery unit. The method may further include heating a thermal mass with the waste heat recovery unit. The method may further include transporting the cooled process gas from the compressed gas storage unit to the thermal mass. The method may further include heating the cooled process gas with the thermal mass to produce a heated process gas. The method may further include transporting the heated process gas from the thermal mass to a power generation unit. The method may further include generating a power output with the power generation unit.

Embodiments of the disclosure may further provide a compressed air energy storage system. A compressor may be coupled to and driven by a driver, and the compressor may be adapted to compress a process gas. A first heat transfer unit may be coupled to the compressor and adapted receive the process gas from the compressor and transfer heat from the process gas to a first heat transfer medium. A first waste heat recovery unit may be coupled to the first heat transfer unit and adapted to receive the first heat transfer medium from the first heat transfer unit and generate a first power output. A process cooler may be coupled to the first heat transfer unit and adapted to receive the process gas from the first heat transfer unit and cool the process gas. A compressed gas storage unit may be coupled to the process cooler and adapted to receive process gas from the process cooler and store the process gas. An electric heater may be coupled to the first waste heat recovery unit and adapted to receive the first power output. A thermal mass may be coupled to the electric heater and the compressed gas storage unit and adapted to be heated by the electric heater, to receive the process gas from the compressed gas storage unit, and to heat the process gas. A power generation unit may be coupled to the thermal mass and adapted to receive the process gas from the thermal mass and generate a second power output.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure, however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1:
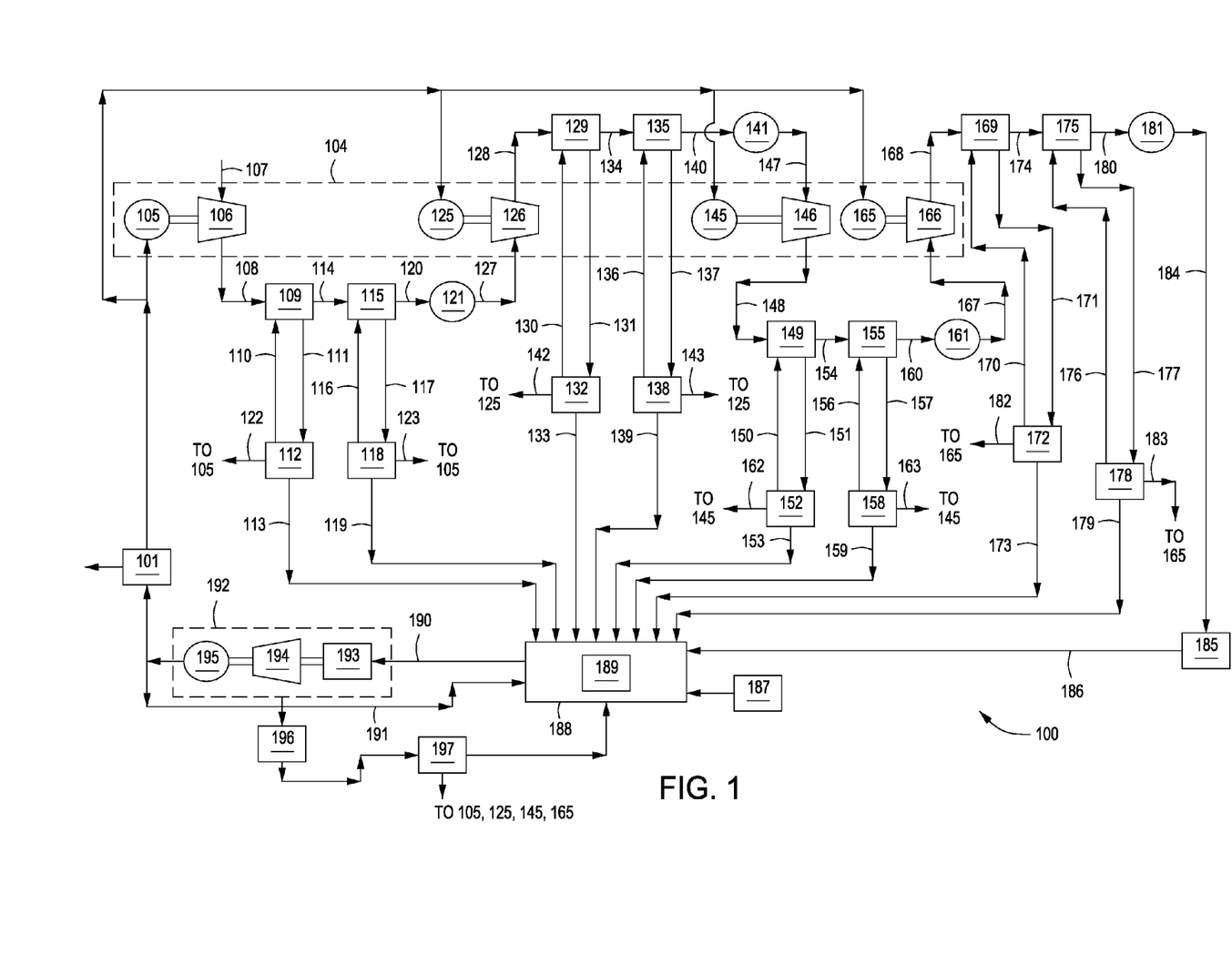
FIG. 1 depicts a block diagram of an illustrative adiabatic CAES system, according to one or more embodiments described.

FIG. 1 depicts a block diagram of an illustrative adiabatic CAES system 100, according to one or more embodiments described. The CAES system 100 may include a compressor train 104 having one or more compressors 106, 126, 146, 166 adapted to compress a process gas. In at least one embodiment, the process gas may be ambient air. The compressors 106, 126, 146, 166 may be supersonic compressors, centrifugal compressors, axial flow compressors, reciprocating compressors, rotary screw compressors, rotary vane compressors, scroll compressors, diaphragm compressors, or the like.

The compressor train 104 may also include one or more drivers 105, 125, 145, 165 coupled to and adapted to drive the compressors 106, 126, 146, 166. The drivers 105, 125, 145, 165 may be electric motors, turbines, or any other device known in the art to drive a compressor 106, 126, 146, 166. Although four drivers 105, 125, 145, 165 and four compressors 106, 126, 146, 166 are depicted in FIG. 1, any number of drivers 105, 125, 145, 165 and/or compressors 106, 126, 146, 166 may be used in the compressor train 104 of the CAES system 100.

In at least one embodiment, as shown, the first driver 105 may drive the first compressor 106, the second driver 125 may drive the second compressor 126, the third driver 145 may drive the third compressor 146, and the fourth driver 165 may drive the fourth compressor 166. In at least one embodiment, at least one of the drivers 105, 125, 145, 165 and compressors 106, 126, 146, 166 may be disposed together in a hermetically sealed casing (not shown). For example, at least one of the drivers 105, 125, 145, 165 and compressors 106, 126, 146, 166 may include a DATUM® centrifugal compressor unit commercially-available from Dresser-Rand of Olean, N.Y. In another embodiment, at least one of the compressors 106, 126, 146, 166 may include Rampressors® developed by Ramgen Power Systems, LLC of Bellevue, Wash.

During off-peak hours, the compressor train 104 may compress the process gas, and the process gas may be introduced to and stored in a compressed gas storage unit 185. In at least one embodiment, the compressed gas storage unit 185 may be a cavern or a vessel. For example, the compressed gas storage unit 185 may be a rock cavern, a salt cavern, an aquifer, an abandoned mine, a depleted gas field, a container stored under water or above ground, or the like. However, other compressed gas storage units 185 are contemplated herein.

Heat transfer units 109, 115, 129, 135, 149, 155, 169, 175 may be disposed between compressors and/or stages 106, 126, 146, 166 of the compressor train 104. The heat transfer units 109, 115, 129, 135, 149, 155, 169, 175 may include a coil system, a shell-and-tube system, a direct contact system, or other heat transfer system known in the art. A heat transfer medium may flow through the heat transfer units 109, 115, 129, 135, 149, 155, 169, 175 and absorb heat from the process gas. Thus, the heat transfer medium has a higher temperature when it exits the heat transfer units 109, 115, 129, 135, 149, 155, 169, 175 than when it enters the heat transfer units 109, 115, 129, 135, 149, 155, 169, 175, i.e., the heat transfer medium is heated, and the process gas has a lower temperature when it exits the heat transfer units 109, 115, 129, 135, 149, 155, 169, 175 than when it enters the heat transfer units 109, 115, 129, 135, 149, 155, 169, 175, i.e., the process gas is cooled. The heat transfer medium may be water, steam, a suitable refrigerant, a process gas such as $CO_2$ or propane, a combination thereof, or any other suitable heat transfer medium.

Heat transfer units 109, 129, 149, 169 may be high grade heat transfer units, and heat transfer units 115, 135, 155, 175 may be low grade heat transfer units. Each high grade heat transfer unit 109, 129, 149, 169 may be disposed upstream of one or more of the low grade heat transfer units 115, 135, 155, 175. Thus, the process gas introduced to each high grade heat transfer unit 109, 129, 149, 169 may have a higher temperature than the process gas introduced to each adjacent low grade heat transfer unit 115, 135, 155, 175. Depending on the design, one or more of the heat transfer units 109, 115, 129, 135, 149, 155, 169, 175 may, in addition to extracting energy from the process stream, introduce cooling to the process thereby lowering the temperature of the process stream to a temperature lower than ambient. With this configuration, process coolers 121, 141, 161 and 181 are not required.

Each heat transfer unit 109, 115, 129, 135, 149, 155, 169, 175 may be coupled to a waste heat recovery unit (WHRU) 112, 118, 132, 138, 152, 158, 172, 178. After the heat transfer medium flows through and is heated in a heat transfer unit 109, 115, 129, 135, 149, 155, 169, 175, it may be introduced to the waste heat recovery unit (WHRU) 112, 118, 132, 138, 152, 158, 172, 178 coupled to it. The WHRUs 112, 118, 132, 138, 152, 158, 172, 178 may each include a turbine (not shown), such as a high pressure turbine expander, and a generator (not shown). The heat transfer medium may directly drive the turbine expander or may be used to transfer thermal energy to another gas to drive the turbine expander, and the turbine expander may power the generator, which may generate electrical power.

WHRUs 112, 132, 152, 172 may be high grade WHRUs, and WHRUs 118, 138, 158, 178 may be low grade WHRUs. The high grade WHRUs 112, 132, 152, 172 may receive the heat transfer medium from the high grade heat transfer units 109, 129, 149, 169, and the low grade WHRUs 118, 138, 158, 178 may receive the heat transfer medium from the low grade heat transfer units 115, 135, 155, 175. In at least one embodiment, the WHRUs 112, 118, 132, 138, 152, 158, 172, 178 may recover between about 10% and about 30%, about 20% and about 40%, about 25% and about 50%, or more of the energy put into the system depending on the temperature of the process stream and the design of the WHRU. The amount of energy recovered is directly dependent on the temperature of the process stream. In at least one embodiment, the high grade WHRUs 112, 132, 152, 172 may generate between about 5 MW and about 15 MW of electrical power, and the low grade WHRUs 118, 138, 158, 178 may generate between about 1 MW and about 5 MW. For example, the high grade WHRUs 112, 132, 152, 172 may generate between about 8.5 MW and about 12 MW of electrical power, and the low grade WHRUs 118, 138, 158, 178 may generate between about 2 MW and about 4 MW.

Process coolers 121, 141, 161, 181 may be disposed between the compressors 106, 126, 146, 166 and/or compressor stages in the compressor train 104. In at least one embodiment, the process coolers 121, 141, 161, 181 may be aftercoolers or intercoolers. The process coolers 121, 141, 161, 181 may remove the remaining heat from the air that did not get removed by the heat transfer units 109, 115, 129, 135, 149, 155, 169, 175 and reject that residual heat to the atmosphere. An energy extraction scheme may be used that returns air to the next stage compressor that is colder than ambient.

The electrical power generated by the WHRUs 112, 118, 132, 138, 152, 158, 172, 178 may power one or more electric heaters (one is shown) 189 disposed on or in a thermal mass 188. Thus, heat energy from the process gas compressed by the compressor train 104 may be used to heat the thermal mass 188. In at least one embodiment, the thermal mass 188 may include a solid mass, a liquid mass, hot salt, or the like. For example, the thermal mass 188 may include water, earth, rammed earth, mud, rocks, stones, concrete, or wood. However, other materials are contemplated herein. In at least one embodiment, the thermal mass 188 may be disposed within a man-made insulated vessel (not shown).

An energy source 187 may be used to augment the power supplied to the electric heater 189. The energy source 187 may be a gas generator or the electrical grid. The energy source 187 may also be a renewable energy source such as wind energy, solar energy, geothermal energy, or any other renewable energy source known in the art.

During peak hours, the compressed process gas may be drawn from the compressed gas storage unit 185 and used to power a power generation unit 192. Prior to reaching the power generation unit 192, the compressed process gas may be introduced to the thermal mass 188, and heat from the thermal mass 188 may be transferred to the compressed process gas. In at least one embodiment, the compressed process gas may be injected free flow into the thermal mass 188.

The heated process gas may be supplied from the thermal mass 188 to the power generation unit 192. In at least one embodiment, the power generation unit 192 may include an expander 194 and an electrical generator 195. The heated process gas may expand in the expander 194 generating mechanical power to drive the electrical generator 195. In at least one embodiment, the heated process gas from the thermal mass 188 may be combined with fuel and combusted in a combustor 193 prior to entering the expander 194. The fuel may include a hydrocarbon feed or other fuel known in the art. The electrical generator 195 may generate and supply power to the electrical grid 101 during peak hours. In at least one embodiment, the power generation unit 192 may generate between 10 MW and 40 MW. In another embodiment, the power generation unit 192 may generate between 100 MW and 170 MW.

In operation, the process gas may be introduced to the first compressor 106 via line 107. In at least one embodiment, the process gas in line 107 may have a pressure between about 10 psia and about 20 psia, a temperature between about 40° F. and about 110° F., a relative humidity (RH) between about 50% and about 70%, and a flow rate between about 370 lbs/sec and about 470 lbs/sec. In another embodiment, the RH could be between about 0% and about 100% and the flow rate could be between about 25 lbs/sec and about 100 lbs/sec. For example, the process gas in line 107 may have a pressure of about 14.7 psia, a temperature of about 95° F., a RH of about 60%, and a flow rate of about 420 lbs/sec. The first compressor 106 may compress the process gas and output the compressed process gas in line 108. The compressed process gas in line 108 may have a pressure between about 60 psia and about 90 psia and a temperature between about 350° F. and about 450° F. For example, the compressed process gas in line 108 may have a pressure of about 75 psia and a temperature of about 400° F.

The compressed process gas may be introduced to the first heat transfer unit 109 via line 108, and the heat transfer medium may be introduced to the first heat transfer unit 109 via line 110. The heat transfer unit 109 transfers heat from the compressed process gas to the heat transfer medium and outputs the process gas in line 114 and the heat transfer medium in line 111.

The heat transfer medium in line 111 may be introduced to the first WHRU 112. In at least one embodiment, the first WHRU 112 may generate electrical power in line 113 that powers the electric heater 189. In another embodiment, the first WHRU 112 may generate electrical power that is supplied to the first driver 105 via line 122. Thus, heat energy from the compressed process gas in line 108 may be used to heat the thermal mass 188 and/or power the first driver 105.

In at least one embodiment, the process gas in line 114 may have a pressure between about 50 psia and about 80 psia and a temperature between about 300° F. and about 500° F. For example, the process gas in line 114 may have a pressure of about 73 psia and a temperature of about 250° F. The process gas may be introduced to the second heat transfer unit 115 via line 114, and the heat transfer medium may be introduced to the second heat transfer unit 115 via line 116. The heat transfer unit transfers heat from the process gas to the heat transfer medium and outputs the process gas in line 120 and the heat transfer medium in line 117.

The heat transfer medium in line 117 may be introduced to the second WHRU 118. In at least one embodiment, the second WHRU 118 may generate electrical power in line 119 that powers the electric heater 189. In another embodiment, the second WHRU 118 may generate electrical power that is supplied to the first driver 105 via line 123. Thus, heat energy from the process gas in line 114 may be used to heat the thermal mass 188 and/or power the first driver 105.

In at least one embodiment, the process gas in line 120 may have a pressure between about 50 psia and about 80 psia and a temperature between about 300° F. and about 500° F. For example, the process gas in line 120 may have a pressure of about 73 psia and a temperature of about 150° F. The process gas in line 120 may be introduced to the first process cooler 121, which may further cool the process gas and output the process gas in line 127. In at least one embodiment, the process gas in line 127 may have a pressure between about 55 psia and 85 psia and a temperature between about 100° F. and about 160° F. For example, the process gas in line 127 may have a pressure of about 70 psia and a temperature of about 130° F.

The process gas in line 127 may be introduced to the second compressor 126. The second compressor 126 may compress the process gas in line 127 and output a second compressed process gas in line 128. In at least one embodiment, the second compressed process gas in line 128 may have a pressure between about 200 psia and about 300 psia and a temperature between about 250° F. and about 350° F. For example, the second compressed process gas in line 128 may have a pressure of about 250 psia and a temperature of about 300° F.

The second compressed process gas may be introduced to the third heat transfer unit 129 via line 128, and the heat transfer medium may be introduced to the third heat transfer unit 129 via line 130. The third heat transfer unit 129 transfers heat from the second compressed process gas to the heat transfer medium and outputs the process gas in line 134 and the heat transfer medium in line 131.

The heat transfer medium in line 131 may be introduced to the third WHRU 132. In at least one embodiment, the third WHRU 132 may generate electrical power in line 133 that powers the electric heater 189. In another embodiment, the third WHRU 132 may generate electrical power that is supplied to the second driver 125 via line 142. Thus, heat energy from the second compressed process gas in line 128 may be used to heat the thermal mass 188 and/or power the second driver 125.

In at least one embodiment, the process gas in line 134 may have a pressure between about 200 psia and about 500 psia and a temperature between about 100° F. and about 300° F. For example, the process gas in line 134 may have a pressure of about 250 psia and a temperature of about 200° F. The process gas may be introduced to the fourth heat transfer unit 135 via line 134, and the heat transfer medium may be introduced to the fourth heat transfer unit 135 via line 136. The fourth heat transfer unit 135 may transfer heat from the process gas to the heat transfer medium and output the process gas in line 140 and the heat transfer medium in line 137.

The heat transfer medium in line 137 may be introduced to the fourth WHRU 138. In at least one embodiment, the fourth WHRU 138 may generate electrical power in line 139 that powers the electric heater 189. In another embodiment, the fourth WHRU 138 may generate electrical power that is supplied to the second driver 125 via line 143. Thus, heat energy from the process gas in line 134 may be used to heat the thermal mass 188 and/or power the second driver 125.

In at least one embodiment, the process gas in line 140 may have a pressure between about 200 psia and about 500 psia and a temperature between about 100° F. and about 300° F. For example, the process gas in line 140 may have a pressure of about 245 psia and a temperature of about 125° F. The process gas in line 140 may be introduced to the second process cooler 141, which further cools the process gas and outputs the process gas in line 147. In at least one embodiment, the process gas in line 147 may have a pressure between about 195 psia and about 295 psia and a temperature between about 100° F. and about 160° F. For example, the process gas in line 147 may have a pressure of about 245 psia and a temperature of about 130° F. The process gas in line 147 may be introduced to the third compressor 146. The third compressor 146 may compress the process gas and output a third compressed process gas in line 148. In at least one embodiment, the third compressed process gas in line 148 may have a pressure between about 500 PSIA and about 600 PSIA and a temperature between about 250° F. and about 350° F. For example, the third compressed process gas in line 148 may have a pressure of about 550 PSIA and a temperature of about 300° F.

The third compressed process gas may be introduced to the fifth heat transfer unit 149 via line 148, and the heat transfer medium may be introduced to the fifth heat transfer unit 149 via line 150. The fifth heat transfer unit transfers heat from the third compressed process gas to the heat transfer medium and outputs the process gas in line 154 and the heat transfer medium in line 151

The heat transfer medium in line 151 may be introduced to the fifth WHRU 152. In at least one embodiment, the fifth WHRU 152 may generate electrical power in line 153 that powers the electric heater 189. In another embodiment, the fifth WHRU 152 may generate electrical power that is supplied to the third driver 145 via line 162. Thus, heat energy from the third compressed process gas in line 148 may be used to heat the thermal mass 188 and/or power the third driver 145.

In at least one embodiment, the process gas in line 154 may have a pressure between about 300 psia and about 600 psia and a temperature between about 200° F. and about 500° F. For example, the process gas in line 154 may have a pressure of about 545 psia and a temperature of about 175° F. The process gas may be introduced to the sixth heat transfer unit 155 via line 154, and the heat transfer medium may be introduced to the sixth heat transfer unit 155 via line 156. The sixth heat transfer unit transfers heat from the process gas to the heat transfer medium and outputs the process gas in line 160 and the heat transfer medium in line 157

The heat transfer medium in line 157 may be introduced to the sixth WHRU 158. In at least one embodiment, the sixth WHRU 158 may generate electrical power in line 159 that powers the electric heater 189. In another embodiment, the sixth WHRU 158 may generate electrical power that is supplied to the third driver 145 via line 163. Thus, heat energy from the process gas in line 154 may be used to heat the thermal mass 188 and/or power the third driver 145.

In at least one embodiment, the process gas in line 160 may have a pressure between about 300 psia and about 600 psia and a temperature between about 100° F. and about 200° F. For example, the process gas in line 160 may have a pressure of about 540 psia and a temperature of about 100° F. The process gas in line 160 may be introduced to the third process cooler 161, which may further cool the process gas and output the process gas in line 167. In at least one embodiment, the process gas in line 167 may have a pressure between about 495 psia and about 595 psia and a temperature between about 100° F. and 160° F. For example, the process gas in line 167 may have a pressure of about 545 psia and a temperature of about 130° F.

The process gas in line 167 may be introduced to the fourth compressor 166. The fourth compressor 166 may compress the process gas and output a fourth compressed process gas in line 168. In at least one embodiment, the fourth compressed process gas in line 168 may have a pressure between about 1320 psia and about 1720 psia and a temperature between about 250° F. and about 350° F. For example, the fourth compressed process gas in line 168 may have a pressure of about 1520 psia and a temperature of about 300° F.

The fourth compressed process gas may be introduced to the seventh heat transfer unit 169 via line 168, and the heat transfer medium may be introduced to the seventh heat transfer unit 169 via line 170. The seventh heat transfer unit 169 transfers heat from the fourth compressed process gas to the heat transfer medium and outputs and the process gas in line 174 and the heat transfer medium in line 171.

The heat transfer medium in line 171 may be introduced to the seventh WHRU 172. In at least one embodiment, the seventh WHRU 172 may generate electrical power in line 173 that powers the electric heater 189. In another embodiment, the seventh WHRU 172 may generate electrical power that is supplied to the fourth driver 165 via line 182. Thus, heat energy from the fourth compressed process gas in line 168 may be used to heat the thermal mass 188 and/or power the fourth driver 165.

In at least one embodiment, the process gas in line 174 may have a pressure between about 1250 psia and about 1800 psia and a temperature between about 200° F. and about 300° F. For example, the process gas in line 174 may have a pressure of about 1515 psia and a temperature of about 185° F. The process gas may be introduced to the eighth heat transfer unit 175 via line 174, and the heat transfer medium may be introduced to the eighth heat transfer unit 175 via line 176. The eighth heat transfer unit transfers heat from the process gas to the heat transfer medium and outputs and the process gas in line 180 and the heat transfer medium in line 177.

The heat transfer medium in line 177 may be introduced to the eighth WHRU 178. In at least one embodiment, the eighth WHRU 178 may generate electrical power in line 179 that powers the electric heater 189. In another embodiment, the eighth WHRU 178 may generate electrical power that is supplied to the fourth driver 165 via line 183. Thus, heat energy from the process gas in line 174 may be used to heat the thermal mass 188 and/or power the fourth driver 165.

In at least one embodiment, the process gas in line 180 may have a pressure between about 1250 psia and about 1800 psia and a temperature between about 100° F. and about 200° F. For example, the process gas in line 180 may have a pressure of about 1510 psia and a temperature of about 120° F. The process gas in line 180 may be introduced to the fourth process cooler 181, which further cools process gas and outputs the process gas in line 184. In at least one embodiment, the process gas in line 184 may have a pressure between about 1300 psia and about 1700 psia and a temperature between about 70° F. and 100° F. For example, the process gas in line 184 may have a pressure of about 1500 psia and a temperature of about 85° F.

The process gas in line 184 may be introduced to and stored in the compressed gas storage unit 185 during off-peak hours. During peak hours, the process gas may be drawn from the compressed gas storage unit 185 and used to power the power generation unit 192. Prior to being introduced to the power generation unit 192, the process gas may be introduced to the thermal mass 188 via line 186. The thermal mass may transfer heat to the process gas. The thermal mass 188 may heat the compressed process gas to a temperature between about 600° F. and about 1400° F. For example, the thermal mass 188 may heat the compressed process gas to a temperature between about 800° F. and about 1000° F.

The process gas may be transported from the thermal mass 188 to the power generation unit 192 via line 190. The process gas may expand in the expander 194 generating mechanical power to drive the electrical generator 195. In at least one embodiment, the process gas is combined with fuel and combusted in a combustor 193 prior to being introduced to the expander 194. The electrical generator 195 may generate and supply power to the electrical grid 101 during peak hours. In at least one embodiment, at least a portion of the electrical power generated by the electrical generator 195 may be introduced to the electric heater 189 via line 191.

Figure 2:
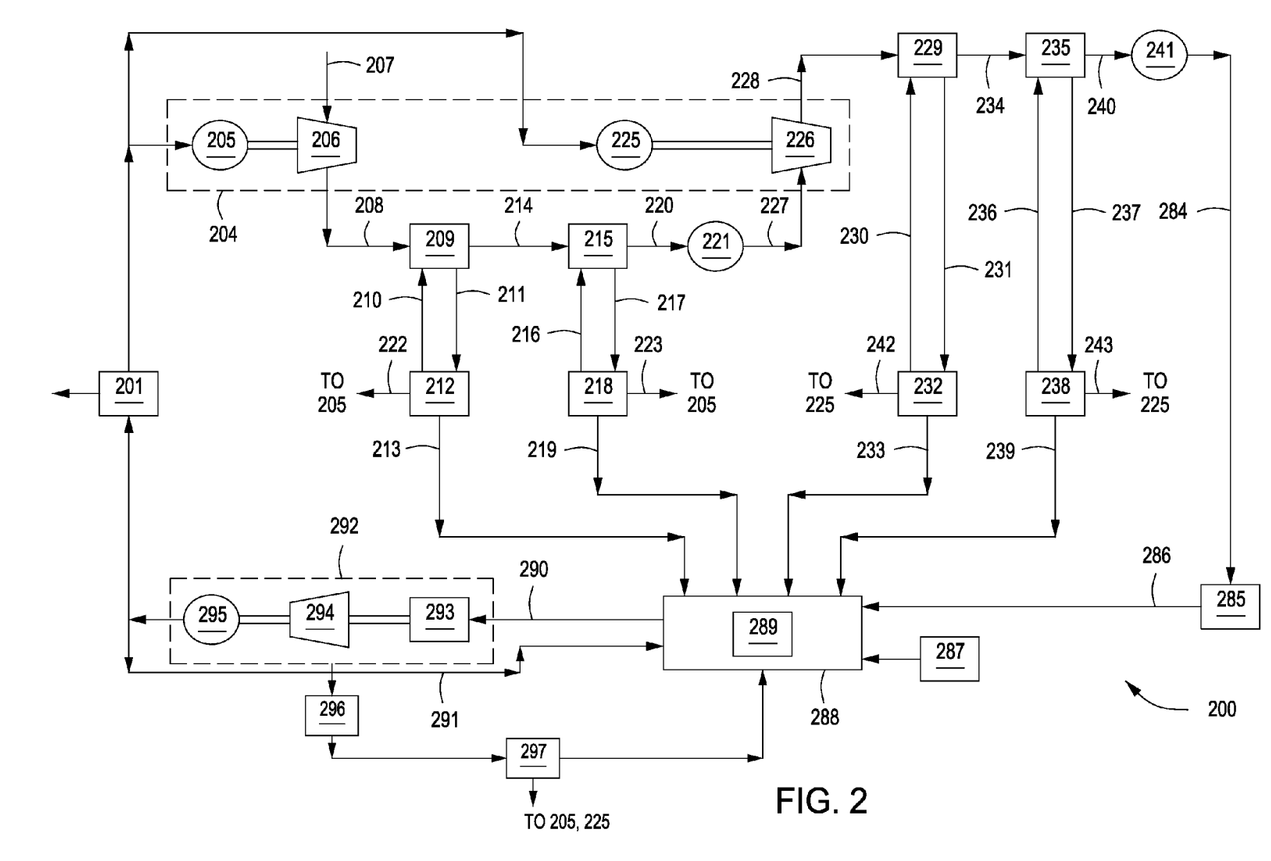
FIG. 2 depicts a block diagram of another illustrative adiabatic CAES system including a supersonic compressor train, according to one or more embodiments described.

FIG. 2 depicts a block diagram of another illustrative adiabatic CAES system 200 including a supersonic compressor train 204, according to one or more embodiments described.

In at least one embodiment, the components in FIG. 2 may be substantially similar to the corresponding components in FIG. 1, except, the compressors 206, 226 in FIG. 2 may be supersonic compressors. The supersonic compressors 206, 226 in the supersonic compressor train 204 may achieve the desired temperature and pressure with fewer compressors than a subsonic compressor train 104 (see FIG. 1). In at least one embodiment, the supersonic compressors 206, 226 may be Rampressors® developed by Ramgen Power Systems, LLC of Bellevue, Wash. In at least one embodiment, the first compressor 206 may be a supersonic compressor having about a 60 inch wheel, and the second compressor may be a supersonic compressor having about a 34 inch wheel. Any number of supersonic compressors 206, 226 may be used in the supersonic compressor train 204.

The supersonic compressors 206, 226 may be driven by drivers 205, 225. In at least one embodiment, the first driver 205 may be about a 71 MW electric motor, and the second driver 225 may be about a 69 MW electric motor. However, other motor sizes are contemplated herein.

In operation, the process gas may be introduced to the first supersonic compressor 206 via line 207. In at least one embodiment, the process gas in line 207 may have a pressure between about 10 psia and 20 psia, a temperature between about 80° F. and about 110° F., a RH between about 50% and about 70%, and a flow rate between about 370 lbs/sec and about 470 lbs/sec. For example, the process gas in line 207 may have a pressure of about 14.7 PSIA, a temperature of about 95° F., a RH of about 60%, and a flow rate of about 420 lbs/sec. The first supersonic compressor 206 may compress the process gas and output a first compressed process gas in line 208. In at least one embodiment, the first compressed process gas in line 208 may have a pressure between about 100 psia and about 200 psia and a temperature between about 600° F. and about 800° F. For example, the first compressed process gas in line 208 may have a pressure of about 152.5 psia and a temperature of about 700° F.

The first compressed process gas may be introduced to the first heat transfer unit 209 via line 208, and the heat transfer medium may be introduced to the first heat transfer unit 209 via line 210. The first heat transfer unit 209 transfers heat from the first compressed process gas to the heat transfer medium and outputs and the process gas in line 214 and the heat transfer medium in line 211

The heat transfer medium in line 211 may be introduced to the first WHRU 212. In at least one embodiment, the first WHRU 212 may generate electrical power in line 213 that powers the electric heater 289. In another embodiment, the first WHRU 212 may generate electrical power that is supplied to the first driver 205 via line 222. Thus, heat energy from the first compressed process gas in line 208 may be used to heat the thermal mass 288 and/or power the first driver 205.

In at least one embodiment, the process gas in line 214 may have a pressure between about 120 psia and about 220 psia and a temperature between about 160° F. and about 360° F. For example, the process gas in line 214 may have a pressure of about 170 psia and a temperature of about 260° F. The process gas may be introduced to the second heat transfer unit 215 via line 214, and the heat transfer medium may be introduced to the second heat transfer unit 215 via line 216. The second heat transfer unit 215 transfers heat from the process gas to the heat transfer medium and outputs the process gas in line 220 and the heat transfer medium in line 217.

The heat transfer medium in line 217 may be introduced to the second WHRU 218. In at least one embodiment, the second WHRU 218 may generate electrical power in line 219 that powers the electric heater 289. In another embodiment, the second WHRU 218 may generate electrical power that is supplied to the first driver 205 via line 223. Thus, heat energy from the process gas in line 214 may be used to heat the thermal mass 288 and/or power the first driver 205.

In at least one embodiment, the process gas in line 220 may have a pressure between about 110 psia and about 180 psia and a temperature between about 100° F. and about 250° F. For example, the process gas in line 220 may have a pressure of about 145 psia and a temperature of about 120° F. The gas in line 220 may be introduced to a first process cooler 221, which further cools the process gas and outputs the process gas in line 227. In at least one embodiment, the process gas in line 227 may have a pressure between about 100 psia and 200 psia and a temperature between about 50° F. and about 130° F. For example, the first cooled process gas may have a pressure of about 149 psia and a temperature of about 93° F.

The process gas in line 227 may be introduced to the second supersonic compressor 226. The second supersonic compressor 226 may compress the process gas and output a second compressed process gas in line 228. In at least one embodiment, the second compressed process gas in line 228 may have a pressure between about 1325 psia and about 1725 psia and a temperature between about 600° F. and about 800° F. For example, the second compressed process gas in line 228 may have a pressure of about 1525 psia and a temperature of about 699° F.

The second compressed process gas may be introduced to the third heat transfer unit 229 via line 228, and the heat transfer medium may be introduced to the third heat transfer unit 229 via line 230. The third heat transfer unit transfers heat from the second compressed process gas to the heat transfer medium and outputs the process gas in line 234 and the heat transfer medium in line 231.

The heat transfer medium in line 231 may be introduced to the third WHRU 232. In at least one embodiment, the third WHRU 232 may generate electrical power in line 233 that powers the electric heater 289. In another embodiment, the third WHRU 232 may generate electrical power that is supplied to the second driver 225 via line 242. Thus, heat energy from the second compressed process gas in line 228 may be used to heat the thermal mass 288 and/or power the second driver 225.

In at least one embodiment, the process gas in line 234 may have a pressure between about 1250 psia and about 1800 psia and a temperature between about 160° F. and about 360° F. For example, the process gas in line 234 may have a pressure of about 1520 psia and a temperature of about 260° F. The process gas may be introduced to the fourth heat transfer unit 235 via line 234, and the heat transfer medium may be introduced to the fourth heat transfer unit 235 via line 236. The fourth heat transfer unit transfers heat from the process gas to the heat transfer medium and outputs the process gas in line 240 and the heat transfer medium in line 237.

The heat transfer medium in line 237 may be introduced to the fourth WHRU 238. In at least one embodiment, the fourth WHRU 238 may generate electrical power in line 239 that powers the electric heater 289. In another embodiment, the fourth WHRU 238 may generate electrical power that is supplied to the second driver 225 via line 243. Thus, heat energy from the process gas in line 234 may be used to heat the thermal mass 288 and/or power the second driver 225.

In at least one embodiment, the process gas in line 240 may have a pressure between about 1250 psia and about 1800 psia and a temperature between about 160° F. and about 360° F. For example, the process gas in line 240 may have a pressure of about 1515 psia and a temperature of about 120° F. The process gas in line 240 may be introduced to the second process cooler 241, which may further cool the process gas and output the process gas in line 284. In at least one embodiment, the process gas in line 284 may have a pressure between about 1300 psia and about 1700 psia and a temperature between about 70° F. and about 100° F. For example, the process gas in line 284 may have a pressure of about 1500 psia and a temperature of about 85° F.

The process gas in line 284 may be introduced to and stored in the compressed gas storage unit 285 during off-peak hours. During peak hours, the process gas may be drawn from the compressed gas storage unit 285 and used to power the power generation unit 292. Prior to being introduced to the power generation unit 292, the process gas may be introduced to the thermal mass 288 via line 286. The thermal mass 288 may heat the process gas in line 286. In at least one embodiment, thermal mass 288 may heat the process gas in line 286 to a temperature between about 800° F. and about 1400° F. For example, the thermal mass 288 may heat the process gas to a temperature between about 800° F. and about 1000° F.

The process gas may be transported from the thermal mass 288 to the power generation unit 292 via line 290. The process gas in line 290 may power the expander 294. In at least one embodiment, the process gas in line 290 may be combined with fuel and combusted in a combustor 293 prior to being introduced to the expander 294. The expander 294 may drive an electrical generator 295, and the electrical generator 295 may generate and supply power to the electrical grid 201 during peak hours. In at least one embodiment, at least a portion of the electrical power generated by the electrical generator 295 may be introduced to the electric heater 289 via line 291.

Figure 3:
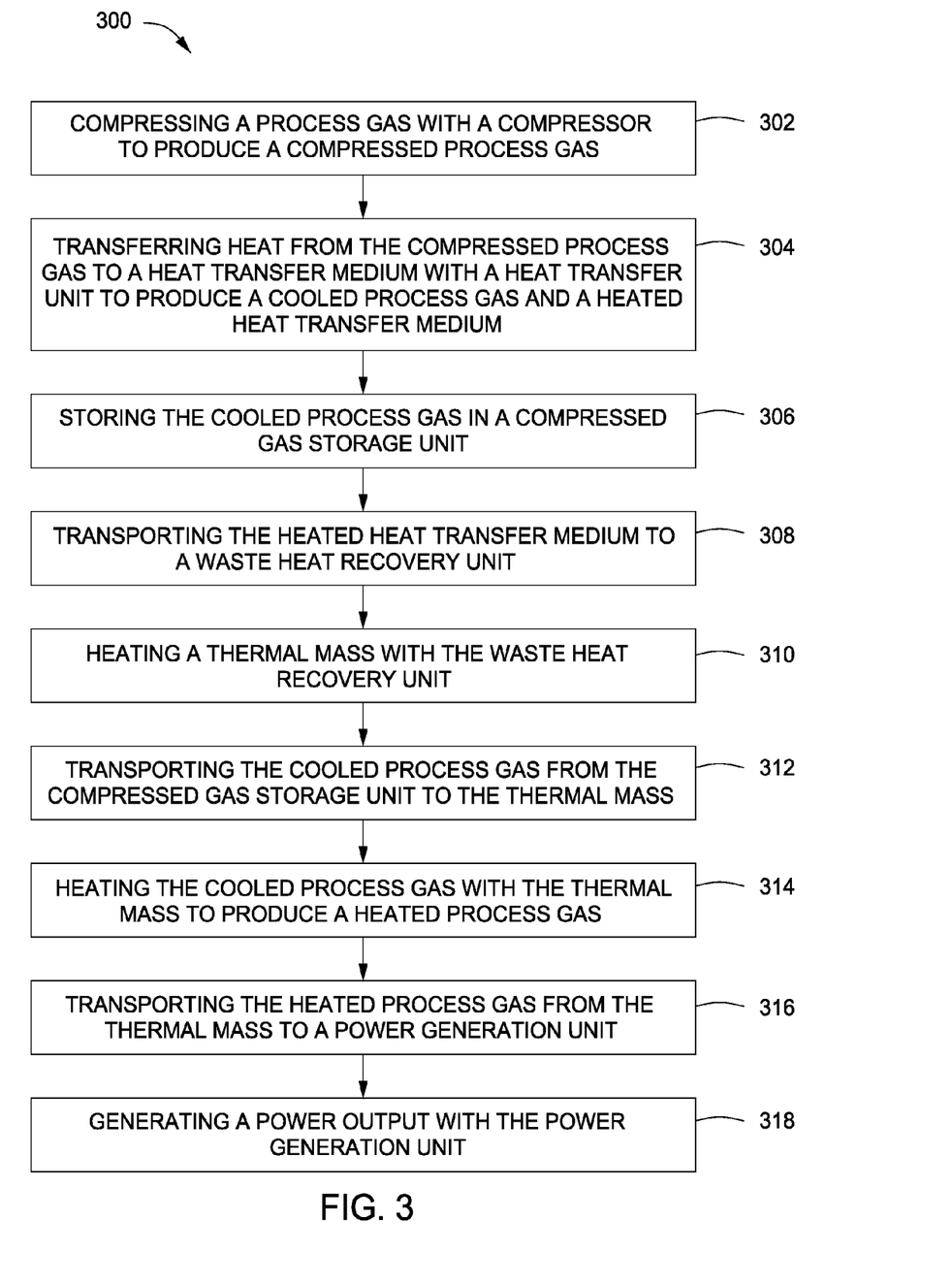
FIG. 3 depicts a flow chart of an illustrative method of generating power using stored compressed air energy, according to one or more embodiments described.

FIG. 3 depicts a flowchart of an illustrative method 300 of generating power using stored compressed air energy. The method 300 includes compressing a process gas with a compressor to produce a compressed process gas, as shown at 302. The method 300 also includes transferring heat from the compressed process gas to a heat transfer medium with a heat transfer unit to produce a cooled process gas and a heated heat transfer medium, as shown at 304. The method 300 also includes storing the cooled process gas in a compressed gas storage unit, as shown at 306. The method 300 also includes transporting the heated heat transfer medium to a waste heat recovery unit, as shown at 308. The method 300 also includes heating a thermal mass with the waste heat recovery unit, as shown at 310. The method 300 also includes transporting the cooled process gas from the compressed gas storage unit to the thermal mass, as shown at 312. The method 300 also includes heating the cooled process gas with the thermal mass to produce a heated process gas, as shown at 314. The method 300 also includes transporting the heated process gas from the thermal mass to a power generation unit, as shown at 316. The method 300 also includes generating a power output with the power generation unit, as shown at 318.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A compressed air energy storage system, comprising:
   a compressor train including a plurality of compressors, each compressor of the plurality of compressors being configured to receive a process gas and output a compressed process gas;
   a plurality of heat transfer units, each heat transfer unit of the plurality of heat transfer units being coupled to a respective compressor of the plurality of compressors and configured to receive the compressed process gas and a heat transfer medium and to output a cooled process gas and a heated heat transfer medium;
   a compressed gas storage unit coupled to a heat transfer unit of the plurality of heat transfer units and configured to receive and store the cooled process gas from the heat transfer unit;
   a plurality of waste heat recovery units, each waste heat recovery unit of the plurality of waste heat recovery units being coupled to a respective heat transfer unit of the plurality of heat transfer units and configured to receive the heated heat transfer medium and generate electrical power;
   an electric heater coupled to each waste heat recovery unit of the plurality of waste heat recovery units and configured to receive the electrical power from each waste heat recovery unit of the plurality of waste heat recovery units and generate heat;
   a thermal mass in thermal communication with the electric heater and the compressed gas storage unit, the thermal mass configured to be heated by the heat generated by the electric heater, to receive the cooled process gas from the compressed gas storage unit, to heat the cooled process gas from the compressed gas storage unit, and to output a heated process gas; and
   a power generation unit comprising:
      a combustor coupled to the thermal mass and configured to receive the heated process gas from the thermal mass, combust the heated process gas with a fuel, and output a combusted process gas;
      an expander coupled to the combustor and configured to receive and expand the combusted process gas to generate mechanical energy; and
      an electrical generator coupled to the expander and configured to convert the mechanical energy from the expander to a power output.

2. The system of claim 1, wherein the electric heater is disposed at least one of on and in the thermal mass.

3. The system of claim 2, further comprising a renewable energy source coupled to and configured to power the electric heater.

4. The system of claim 1, further comprising a gas generator coupled to the electric heater and configured to deliver additional electrical power to the electric heater.

5. The system of claim 1, wherein at least one compressor of the plurality of compressors is a supersonic compressor.

6. A method of generating power, comprising:
   compressing a process gas with a compressor train including a plurality of compressors to produce a compressed process gas;
   transferring heat from the compressed process gas to a heat transfer medium with a plurality of heat transfer units to produce a cooled process gas and a heated heat transfer medium, each heat transfer unit of the plurality of heat transfer units being coupled to a respective compressor of the plurality of compressors;
   storing the cooled process gas in a compressed gas storage unit;
   transporting the heated heat transfer medium to a plurality of waste heat recovery units, each waste heat recovery unit of the plurality of waste heat recovery units being coupled to a respective heat transfer unit of the plurality of heat transfer units;
   generating electrical power in the plurality of waste heat recovery units;
   powering an electric heater with the electrical power from the plurality of waste heat recovery units;
   heating a thermal mass with the electric heater;
   transporting the cooled process gas from the compressed gas storage unit to the thermal mass;
   heating the cooled process gas with the thermal mass to produce a heated process gas;
   transporting the heated process gas from the thermal mass to a combustor of a power generation unit;
   combusting the heated process gas with a fuel in the combustor to produce a combusted process gas;
   expanding the combusted process gas in an expander of the power generation unit to generate mechanical energy; and
   converting the mechanical energy from the expander to a power output with an electrical generator of the power generation unit.

7. The method of claim 6, further comprising:
   driving each compressor of the plurality of compressors with a driver; and
   powering the driver with the plurality of waste heat recovery units.

8. The method of claim 6, further comprising operating at least one compressor of the plurality of compressors at supersonic speed.

9. The method of claim 6, wherein the electric heater is disposed at least one of on and in the thermal mass.

10. The method of claim 6, further comprising heating the thermal mass with the power generation unit.

11. The method of claim 10, wherein heating the thermal mass with the power generation unit further comprises powering the electric heater with the power generation unit, wherein the electric heater is disposed at least one of on and in the thermal mass and heats the thermal mass.

12. The method of claim 6, further comprising heating the thermal mass with a renewable energy source.

13. A compressed air energy storage system, comprising:
   a plurality of compressors, each compressor of the plurality of compressors coupled to and driven by a driver and configured to compress a process gas;
   a plurality of heat transfer units, a first heat transfer unit of the plurality of heat transfer units being coupled to a first compressor of the plurality of compressors and configured receive the process gas from the first compressor and transfer heat from the process gas to a first heat transfer medium;
   a plurality of waste heat recovery units, a first waste heat recovery unit of the plurality of waste heat recovery units being coupled to the first heat transfer unit and configured to receive the first heat transfer medium from the first heat transfer unit and generate a first electrical power output;
   a process cooler coupled to the first heat transfer unit and configured to receive the process gas from the first heat transfer unit and cool the process gas;
   a compressed gas storage unit coupled to the process cooler and configured to receive the process gas from the process cooler and store the process gas;

an electric heater coupled to the first waste heat recovery unit and configured to receive the first electrical power output;

a thermal mass in thermal communication with the electric heater and the compressed gas storage unit and configured to be heated by the electric heater, to receive the process gas from the compressed gas storage unit, and to heat the process gas from the compressed gas storage unit; and a power generation unit comprising:

a combustor coupled to the thermal mass and configured to receive the heated process gas from the thermal mass, combust the heated process gas with a fuel, and output a combusted process gas;

an expander coupled to the combustor and configured to receive and expand the combusted process gas to generate mechanical energy; and  an electrical generator coupled to the expander and configured to convert the mechanical energy from the expander to a second electrical power output.

14. The system of claim 13, wherein the electric heater is disposed at least one of on and in the thermal mass.

15. The system of claim 13, wherein a second heat transfer unit of the plurality of heat transfer units is interposed between the first heat transfer unit and the process cooler and configured to receive the process gas from the first heat transfer unit and transfer heat from the process gas to a second heat transfer medium.

16. The system of claim 15, wherein a second waste heat recovery unit of the plurality of waste heat recovery units is coupled to the second heat transfer unit and configured to receive the second heat transfer medium and generate a third electrical power output.

17. The system of claim 16, wherein the electric heater is coupled to the second waste heat recovery unit and configured to receive the third electrical power output.

18. The system of claim 13, wherein the driver comprises an electric motor, and wherein the electric motor and the respective compressor of the plurality of compressors coupled thereto are disposed within a hermetically sealed casing.

\* \* \* \* \*